United States Patent [19]

Hamer et al.

[11] Patent Number: 5,034,103

[45] Date of Patent: Jul. 23, 1991

[54] DISTILLATION COLUMN WITH A DRAW-OFF DEVICE

[75] Inventors: Johannes A. Hamer; Pieter van der Heijden; Pieter J. Hoek, all of the Hague, Netherlands

[73] Assignee: Shell Oil Company, Houston, Tex.

[21] Appl. No.: 477,377

[22] Filed: Feb. 9, 1990

[30] Foreign Application Priority Data

Feb. 10, 1989 [GB] United Kingdom ............... 8903008

[51] Int. Cl.$^5$ ............................................. B01D 3/32
[52] U.S. Cl. ................................... 202/158; 202/197; 196/100; 196/114; 196/133; 203/40; 203/91; 203/DIG. 19
[58] Field of Search ............... 202/158, 159, 154, 197, 202/176, 267.1, 205; 203/40, 90, 86, DIG. 19, 91, 99, DIG. 22; 196/99, 114, 100, 102, 133, 135, 139; 122/489, 492; 208/352, 359, 357

[56] References Cited

U.S. PATENT DOCUMENTS

| | | | |
|---|---|---|---|
| 2,085,422 | 6/1937 | Fast | 208/352 |
| 2,678,199 | 5/1954 | Koch | 202/158 |
| 2,897,146 | 7/1959 | Waddill | 203/40 |
| 2,901,426 | 8/1959 | Waddill et al. | 203/40 |
| 2,956,934 | 10/1960 | Waddill | 202/197 |
| 3,501,400 | 3/1970 | Brady | 203/40 |
| 4,698,138 | 10/1987 | Silvey | 202/158 |
| 4,818,346 | 4/1989 | Bentham et al. | 202/197 |

Primary Examiner—Wilbur Bascomb, Jr.

[57] ABSTRACT

A draw-off device is disclosed for a vacuum distillation column in which device a layer of gutters is provided. A secondary wall is arranged in the gutters creating a heat-insulating layer to reduce the condensation of vapor passing along the outer walls of the gutters.

7 Claims, 1 Drawing Sheet

DISTILLATION COLUMN WITH A DRAW-OFF DEVICE

FIELD OF THE INVENTION

The present invention relates to a draw-off device comprising a horizontal layer of a plurality of parallel, uniformly spaced gutters which are in fluid communication with a collecting gutter which is connected to a fluid outlet. Such a draw-off device is sometimes called a draw-off tray or a chimney tray.

Such a draw-off device is used in a gas/liquid contacting column such as a distillation column to remove liquid from the column.

In a distillation column the draw-off device is usually arranged between the inlet of the distillation column and a contacting device arranged above the inlet, wherein the contacting device can be a spray section, a section provided with packing material or a section provided with contacting trays. During normal operation the vapor fraction of the feed passes upwardly through the spaces between adjacent gutters of the draw-off device and is contacted with liquid in the contacting device. The liquid is introduced into the column to remove entrained liquid from the vapor fraction and/or to condense condensable components. Liquid is collected in the gutters and flows into the collecting gutter. From there the liquid is removed from the column through the fluid outlet.

The temperature of the liquid in the gutters is lower than the temperature of the vapor passing along the gutters. Thus the outer surfaces of the walls of the gutters are cooler than the vapor. Consequently condensation starts at the outer surfaces of the walls of the gutters. The condensed liquid falls into the bottom part of the distillation column and is removed therefrom through a bottoms outlet. This results in a loss of production. In particular in a vacuum distillation process this loss is considerable, since the liquid from the bottom outlet is generally not further treated but simply used as fuel.

OBJECT OF THE INVENTION

It is an object of the present invention to reduce this loss of production.

BRIEF DESCRIPTION OF THE INVENTION

To this end the draw-off device according to the invention comprises a horizontal layer of a plurality of parallel, uniformly spaced gutters which are in fluid communication with a collecting gutter which is connected to a fluid outlet, wherein the walls of the gutters are provided with heat-insulating means.

BRIEF DESCRIPTION OF THE DRAWINGS

The invention will now be described in more detail by way of example with reference to the drawings, wherein.

DETAILED DESCRIPTION OF THE INVENTION

Figure 1:
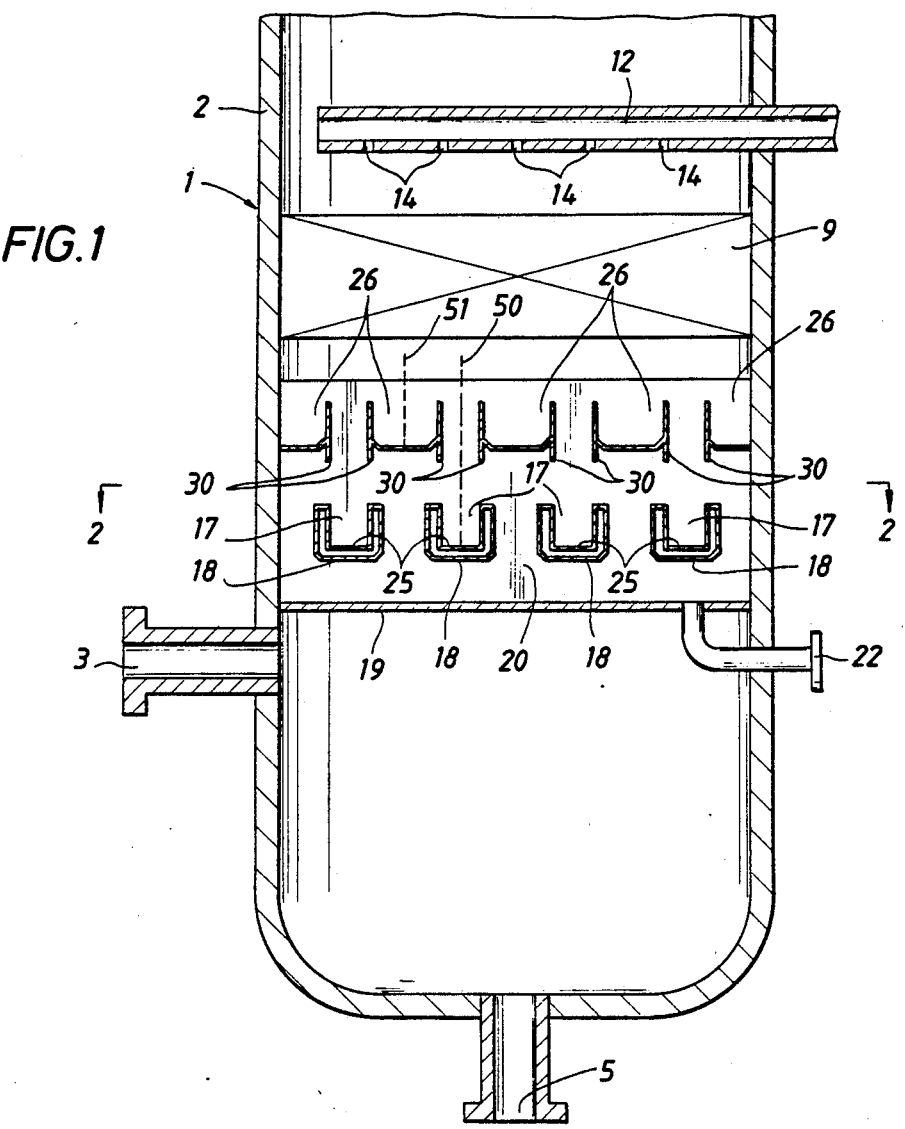
FIG. 1 shows schematically a longitudinal section of the lower end of a vacuum distillation column provided with the draw-off device according to the invention.

The vacuum distillation column 1 comprises a cylindrical housing 2 provided with a feed inlet 3, a bottom outlet 5 and a top outlet (not shown).

In housing 2 there is arranged a de-entrainment device comprising contacting means 9 in the form of structured or random packing, and a liquid spray device 12 provided with nozzles 14.

Figure 2:
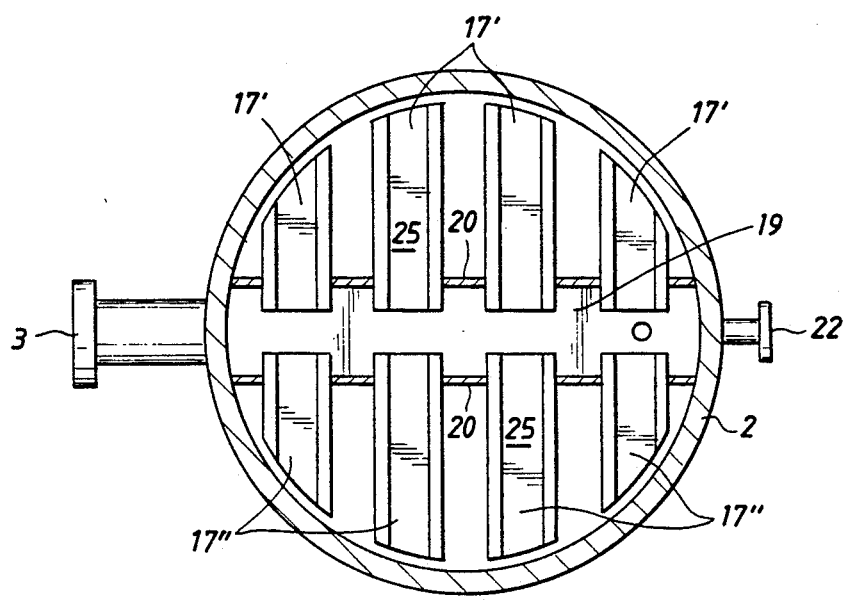
FIG. 2 shows section II—II of FIG. 1.

The housing further contains the draw-off device according to the invention. The draw-off device comprising a horizontal layer of a plurality of parallel, uniformly spaced gutters 17 having walls 18. The gutters 17 are in fluid communication with a collecting gutter 19 which is provided with side walls 20. The collecting gutter is connected to fluid outlet 22. Each gutter 17 comprises a first longitudinal part 17' and a second longitudinal part 17", wherein the ends of the longitudinal parts 17' and 17" near the inner surface of the wall of the column 1 are closed (see FIG. 2), and wherein the open ends extend through the side walls 20 of the collecting gutter 19.

The walls 18 of the gutters 17 are provided with heat-insulating means in the form of a secondary wall 25 arranged in the gutter 17.

The draw-off device further comprises a layer of secondary gutters 26 arranged above the gutters 17. The secondary gutters 26 are arranged staggered with respect to the parallel gutters 17. The secondary gutters 26 are provided with drip strips 30 arranged at the lower parts of the sidewalls of the secondary gutters 26 and extending below the bottom walls of the secondary gutters 26. Each secondary gutter 26 comprises two longitudinal parts (not shown) which debouch into the collector gutter 19 through the side walls 20 of the gutter 19.

During normal operation feed is introduced through the feed inlet 3 and overhead vapors are withdrawn through the top outlet (not shown) which is connected to a vacuum pump (not shown) to maintain a predetermined subatmospheric pressure in the column 1. The vapor fraction of the feed passes upwardly through the spaces between adjacent gutters 17 and is contacted in the contacting means 9 of the de-entrainment section with liquid sprayed out of the liquid spray device 12 to remove entrained liquid from the vapor fraction. Liquid is collected in the gutters 26 and 17 and flows into the collecting gutter 19 and out of the column through the fluid outlet 22.

The liquid fraction of the feed drops into the lower part of the column 1 and is removed therefrom through bottom outlet 5.

The vapor fraction having passed the de-entrainment device is passed through condensation sections (not shown) in which condensible components are removed from the vapor fraction. These condensible fractions are removed from the column through a draw-off device (not shown).

The gutters 17 can be provided with a splash baffle shown as a dashed line indicated with reference numeral 50, and the secondary gutters 26 can be provided with a splash baffle shown as a dashed line indicated with reference numeral 51.

For applications where a low pressure drop is a prerequisite, the width of the gutters is between 20 and 35 cm, and the net free area of the layer of gutters is between 0.3 and 0.5.

For a draw-off device arranged below a de-entrainment section, where it is required that the gas flowing upwards to the contacting means is uniformly distributed, the width of the gutter$ and of the secondary gutters is between 5 and 10 cm, and the net free area of the layer of gutters and of the layer of secondary gutters is between 0.2 and 0.3.

EXAMPLES

Two experiments were carried out in a vacuum distillation column having a diameter of 8.4 m, the column was provided with the gutters as shown in FIG. 1, wherein each layer of gutters included 15 gutters having a width of 0.3 m and a height of 0.2 m, wherein the distance between adjacent gutters was 0.2 m and wherein the distance between the two layers was 0.15 m. In the first experiment the column was provided with the draw-off device according to the invention, and in the second experiment the column was provided with gutters not having the heat-insulating means.

In both experiments the vacuum distillation column was maintained at a pressure of 20 mm Hg. To the feed inlet 3 was supplied 200 M/T (M/T is used to refer to unit mass per unit time) of hydrocarbon-containing feed comprising 50%w vapour at a temperature of 390° C., 10 M/T liquid having a boiling point of 290° C. at 20 mm Hg was supplied to the liquid spray device 12 at a temperature of 290° C. (in the column 50 %w of the liquid vaporized), and 6 M/T liquid, which was removed from the column through liquid outlet 22, was added to the feed so that 206 M/T was introduced into the column.

In the first experiment 100 M/T liquid was removed from the bottom outlet and from the de-entrainment section passed upwards 110 M/T of vapor.

In the second experiment 105 M/T liquid was removed from the bottom outlet 5 and from the de-entrainment section passed upwards only 105 M/T of vapor. It was found that in this case 5 M/T liquid was condensed on the outer surfaces of the gutters without the heat-insulating means.

From the experiments can be concluded that 5% more vapor passes the de-entrainment device and are thereafter removed as product.

We claim:

1. An improved sub-atmospheric distillation column having an interior, outer walls, a feed inlet means, a bottom outlet, a fluid outlet, a liquid draw-off device and a liquid spray dis-entrainment means, wherein the liquid draw-off device located in said interior in said column provides at least one horizontal layer of a plurality of parallel uniformly-spaced gutters having side walls and an imperforate bottom wall, a collecting gutter being located beneath and in fluid communication with said uniformly-spaced gutters, the improvement comprises that said collecting gutter communicates with the fluid outlet, and heat insulating means are connected to said imperforate bottom walls of said uniformly-spaced gutters.

2. The improved column of claim 1, wherein said heat-insulating means comprises a secondary wall connected to said gutter.

3. The improved column of claim 8, wherein said column also contains a layer of secondary gutters having side and bottom walls arranged parallel and staggered with respect to said uniformly spaced gutters.

4. The improved column of claim 3, wherein said secondary gutters are provided with drip strips arranged at the lower parts of said sidewalls and which extend below the bottom walls of said secondary gutters.

5. The improved column of claim 8, wherein said uniformly spaced gutters have a width of between 20 and 35 cm, and wherein the net-free area of the layer of gutters is between 0.3 and 0.5 cm.

6. The improved column of claim 3, wherein said uniformly spaced gutters have a width of between 5 and 10 cm, and wherein the net-free area of the layer of gutters and the layer of secondary gutters is between 0.2 and 0.3 .

7. The improved column one claim 3, wherein said uniformly spaced gutters and said secondary gutters are provided with a splash baffle.

* * * * *